…

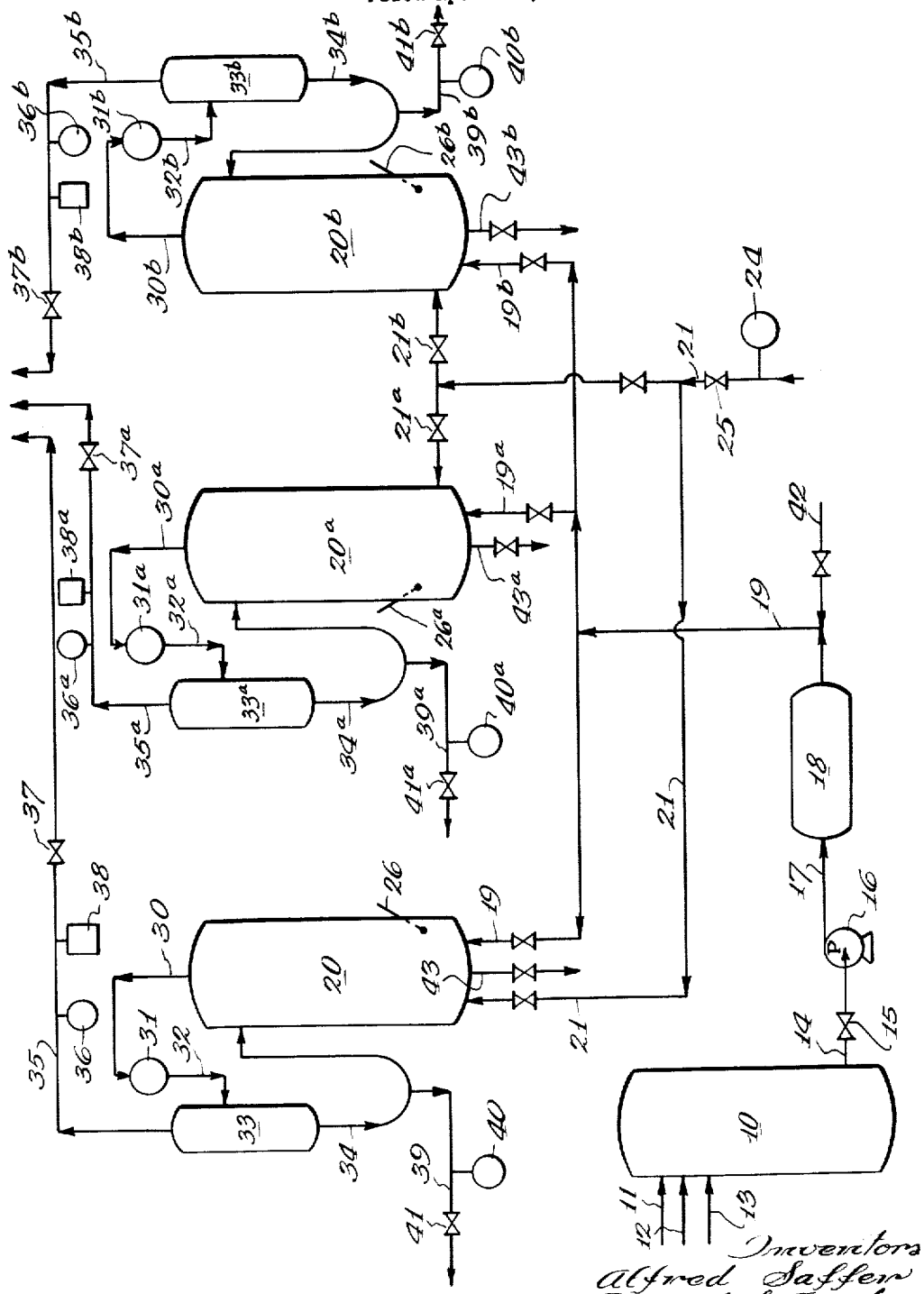

United States Patent Office

3,089,906
Patented May 14, 1963

3,089,906
OXIDATION CHEMICAL PROCESS
Alfred Saffer, Bayside, and Robert S. Barker, Port Washington, N.Y., assignors to Mid-Century Corporation, Chicago, Ill., a corporation of Delaware
Filed Apr. 21, 1958, Ser. No. 729,922
5 Claims. (Cl. 260—524)

This invention relates to improvements in the preparation of aromatic polycarboxylic acids produced by the catalytic liquid phase oxidation of aromatic compounds and more particularly pertains to a process and means for the catalytic liquid phase oxidation of such aromatic compounds in the presence of a particular catalyst system to produce aromatic polycarboxylic acids.

Various methods have been suggested for preparing aromatic polycarboxylic acids. Some of these processes employ catalytic vapor phase oxidations involving oxidation of alkyl groups attached to a benzene nucleus while others involve the splitting of one ring of a fused ring aromatic compound such as naphthalene. Other suggested methods involve the catalytic liquid phase oxidation of para-xylene or meta-xylene, methyl p-toluate or methyl m-toluate with molecular oxygen; nitric acid oxidation of xylenes; air oxidation of p-xylene to p-toluic acid and nitric acid oxidation of p-toluic acid to terephthalic acid; the preparation of ammonium phthalate mono-amide by reaction of m-xylene and ammonium sulfate and a sulfur compound at 2500 to 3000 p.s.i.g. and 570° to 660° F. plus the reaction of sulfuric acid with the mono-amide to liberate isophthalic acid; the thermal disproportionation of two moles of potassium benzate to produce potassium terephthalate and benzene; and through the steps of reacting toluene with carbonyl chloride in the presence of a Friedel-Crafts type catalyst, saponification of the resulting toluic acid amide with caustic and chemical oxidation with potassium permanganate to form sodium potassium terephthalate. Yet none of these processes which utilize xylenes are satisfactory for the preparation of all three isomeric phthalic acids from their corresponding xylenes. Also little is known about the ability of these methods to produce other polycarboxylic acids such as the tri- and tetra-carboxylic acids. Moreover, the suggested methods are not readily adaptable to use mixed polyalkyl feed stocks such as a mixture of isomeric xylenes, diethylbenzenes, diisopropylbenzenes, cymenes and the like, a mixture of isomeric trimethyl benzenes and the like.

There has been discovered a catalytic liquid phase oxidation process for the preparation of aromatic carboxylic acids by which an aliphatic substituted aromatic compound is oxidized with molecular oxygen in the presence of a catalyst system containing a heavy metal oxidation catalyst and a source of bromine and desirably in the presence of an inert reaction medium such as a monocarboxylic acid, preferably a lower saturated aliphatic monocarboxylic acid, i.e. containing 2 to 8 carbon atoms. By this process the aliphatic substituent of a benzenoid ring of an aromatic, fused aromatic, or polyphenyl compound, independent of the size or conformation of the aliphatic substituent, is selectively oxidized to a COOH group attached directly to a benzenoid ring. Metal oxidation catalysts suitable for the catalyst system of this process include those heavy metals capable of existence in variable valence states and are the most desirable as the source of heavy metal oxidation catalyst. Preferred as the source of heavy metal oxidation catalyst in the above catalyst system are manganese, cobalt, nickel, chromium, vanadium, molybdenum, tungsten, tin, gadolinium and cerium. The metals per se can be employed or they may be employed in combined forms providing metal ions such as a manganese acetate, ammonium molybdate, cobalt hydroxy quinolate and manganese versene. The metal oxidation catalyst can be a single source of metal oxidation catalyst or a combination of metal oxidation catalysts. As a source of bromine for the catalyst system there can be employed bromine in elemental, combined or ionic form. Other than bromine itself, hydrogen bromide, ammonium bromide, potassium bromate, tetrabromoethane, benzyl bromide among other compounds soluble in the reactin medium can be employed. This catalytic liquid phase oxidation process is exceptionally efficient for the oxidation of substituted aromatic compounds to aromatic carboxylic acids containing two or more carboxy groups.

It is an object of this invention to provide a process which is satisfactory for the preparation of any individual isomeric phthalic acid alone or in admixture with any one or both of the other isomers by the oxidation of the corresponding xylene or the simultaneous oxidation of any mixture of isomeric xylenes. Another object of this invention is to provide a process and means for oxidizing a xylene feed stock, i.e. a mixture containing predominantly xylenes but also containing monoalkylbenzenes such as toluene and ethylbenzene and non-oxidizable hydrocarbons, to a mixture of aromatic acids predominantly phthalic acids but also containing some benzoic acid. Also it is an object of this invention to provide a process wherein any aromatic compound oxidizable to an aromatic polycarboxylic acid can be oxidized to the corresponding aromatic polycarboxylic acids. Another object includes providing a process and means whereby the oxidation reaction is readily carried out at substantially constant temperature. Additional objects will be apparent from the subsequent detailed description of this invention.

The objects of this invention are, in general, attained by charging to an oxidation reactor a liquid reaction mixture, an oxidizable feed stock comprising an aromatic compound oxidizable to an aromatic carboxylic acid, i.e., an aromatic compound containing one or more aliphatic groups oxidizable to a carboxyl group directly attached to a benzenoid ring, a reaction medium comprising a monocarboxylic acid containing up to 8 carbon atoms, and as a catalyst a metal oxidation catalyst and a source of bromine; carrying out the reaction at a temperature above 140° F., preferably at a temperature of from 300° to 500° F., and at a pressure to maintain a liquid phase. It is preferred to charge the components of the reaction mixture preheated to a temperature at least sufficient for the oxidation reaction to be self-sustaining and permitting the heat of reaction to heat the reaction mixture to the desired reaction temperature. The reaction mixture is agitated throughout the oxidation reaction either mechanically and/or through the addition of the oxygen-containing gas. A maximum reaction rate is maintained by keeping the temperature in the range of 300° to 500° F. at the autogenetic pressure of the reaction mixture throughout the oxidation reaction. A source of molecular oxygen is passed into the liquid portion of the reaction medium in the reactor; at least a portion of the materials vaporized from the reaction mixture is condensed; and at least a portion of the condensate is returned to the reactor to provide removal of heat of reaction to provide control of the reaction temperature. Uncondensed gases are withdrawn to provide pressure control. The reaction pressure is increased near the end of the maximum rate of reaction when the reaction temperature would decrease to hold the reaction temperature constant. The pressure is increased as needed to maintain the reaction temperature and in some cases heat from an external source is added also to maintain the desired reaction temperature. The completion of the reaction, in general, is indicated by a sudden increase in oxygen content in the exit gas. Thereafter there is withdrawn from the reactor at least a portion of the reaction mixture in a continuous process, or withdrawing all of the resulting reaction mixture in a batch process when the oxygen content of the off gases reaches about the explosive limit based on the aromatic compound fed which in most cases is an oxygen content of about 8 to 10% by volume.

It has been discovered that by the process of this invention an aromatic compound oxidizable to an aromatic polycarboxylic acid may be converted to the desired polycarboxylic acid product in high molar yields, above 50 mol percent and up to 85 to 90 mol percent, in one pass through a single reaction stage. Such high single pass conversions to the desired carboxylic acid product may be obtained in relatively short reaction time. The principal advantages of increasing the reaction pressure in the latter portion of the reaction are the ability to maintain for longer periods of time the high rate of oxygen input and the ability to maintain a more nearly constant reaction temperature.

The total amount of molecular oxygen added to the reaction system is, of course, dependent upon the aromatic compound being oxidized. The minimum amount of molecular oxygen added to the reaction mixture is the stoichiometric amount required to react with the aliphatic group or groups being oxidized to a COOH group or groups. For example, the stoichiometric amount of oxygen required for each methyl group oxidized is 1.5 mols of oxygen, for each ethyl group oxidized is 3.0 mols, etc. Since the liquid phase oxidation reaction is in part dependent upon the efficiency of contact between the gas and liquid as well as the rate of absorption and/or reaction of the oxygen in the liquid medium, complete utilization of the oxygen introduced is not attained throughout the entire reaction. However, under the conditions of temperature, pressure, the use of the reaction medium and the use of the catalyst system according to the process of this invention, there is a period of extremely high efficiency of absorption and utilization of the oxygen. The extent of this portion of the reaction during which there is a high rate of utilization of oxygen is dependent upon the aromatic compound being oxidized. When the rate of utilization is high, little or no unconsumed oxygen is present in the exit gas. For example, when a xylene is being oxidized with air there is little or no oxygen, 0 to 2% by volume, in the off gas for as long as about 30 to 40 minutes of a 50 to 60 minute total reaction cycle, which includes a slow addition of source of oxygen at the initial portion of the reaction when oxidation is being initiated and during the finish-off period. The portion of the reaction cycle wherein a highly efficient use of the oxygen is also a major portion of the reaction cycle for many other of the aromatic compounds useful in the process of this invention including but not limited to tertiary-butyl xylenes, toluene, chloro-toluene and durene. When such compounds as pseudocumene, tetra-chloro-p-xylene, acenaphthene, mesitylene and the like are oxidized, the period of extremely high, substantially complete, oxygen utilization is shorter as will be hereinafter illustrated.

The maximum rate at which the source of molecular oxygen can be added to the reaction mixture is not only governed by the rate of utilization and absorption of oxygen, but is also dependent upon such other corelated factors as the hydrostatic head in the reactor and the vapor space in the reactor. Since the process of this invention includes withdrawal of vapors from the reactor, it is important that the maximum rate of addition of molecular oxygen be at a rate below that which causes flooding of the withdrawal conduit and/or the condenser used in the removal of heat of reaction. When oxygen alone is used as the source of molecular oxygen, higher rates of gas flow can be employed than when air is employed since oxygen is only a minor proportion of the air. Another factor to be taken into consideration in arriving at the maximum input of source of molecular oxygen is the expansion of the reaction mixture due to the bouyancy effect of the gas introduced. Provision also must be made for the thermal expansion of the liquid reaction mixture. The combined effects of these two expansions can be illustrated with respect to the use of a specific oxidation reactor. For example, a vertical oxidation reactor is charged with xylene and glacial acetic acid containing the metal oxidation catalyst and bromine catalyst system to about 0.4 of the height of the reactor at reaction temperature and pressure. Under air flow conditions providing optimum air input for this reactor, the space occupied by the reaction mixture is about 0.8 of the height of the reactor leaving about 0.2 of its height as vapor space. Although these data are for a specific reactor, they will clearly indicate to those skilled in the art the effect of these expansion factors for vertical reactors. The expansion effect due to the buoyancy effect of the gas fed as a source of oxygen may not be as great when a horizontal reactor is employed and the source of molecular oxygen is so introduced as to be uniformly distributed throughout the horizontal cross sectional area of the reactor. For any specific reaction vessel the expansion effects can be readily determined and thus the maximum rates of input or full flow of air, oxygen or any other source of molecular oxygen can be determined. These limits are determined by the mechanical aspects of the reactor design and are not chemical aspects of the reaction.

By full flow of air, oxygen or other source of molecular oxygen is meant the maximum rate of input of a source of molecular oxygen which provides maximum utilization of the capacity of the reactor, taking into consideration the above expansion effects, tolerable entrainment and the prevention of the formation of an explosive mixture in the vapors in the reactor as well as in the vented gas. The determination of the maximum flow rates for any specific apparatus and oxidation of a specific aromatic compound requires only the ordinary skill associated with engineering design.

The oxidation reaction can be considered as having three periods of reaction rate. The initial period when oxidation is being initiated, the period of maximum oxidation when the rate of oxygen consumption is maximum and hence full flow of addition of molecular oxygen is utilized, and the latter period of reaction, generally beginning with a temperature drop and accompanied by an increase in oxygen content of the exit gas.

It has also been found that the removal of the more volatile by-products of the oxidation will result in an increased conversion per pass, and also in an increased ultimate yield, achieving in many cases an exceptionally high yield in a single pass. An inevitable by-product of the oxidations under consideration is water, and it has been determined that the conversion and yield of the reaction are greater when the water concentration is controlled. However, a water content of from 5% up to about 30% by weight of the reaction medium can be tolerated by the process of this invention. Formic acid, a by-product when alkyl groups of 2 or more carbon atoms are oxidized, may have a marked deleterious effect on conversion per pass and ultimate yield but by the process of this invention formic acid can be removed and/or maintained at a minimum.

In the process of this invention heat of reaction from the exothermic gas-liquid reactions may be readily removed and the reaction temperature conventiently controlled throughout the portion of maximum reaction by vaporizing and condensing one or more components of the liquid phase wich are vaporized. Passing the uncondensed gases out of the system provides pressure control. This means of control is especially applicable to catalytic oxidation in the liquid phase of aromatic compounds oxidizable to carboxylic acids in the presence of an inert reaction medium.

When necessary, additional heat may be supplied to the reaction mixture in the process of this invention by adding to the liquid phase heat from an external source, thus maintaining the desired reaction rate for a longer period of time. In addition to the obvious ways to add heat from an external source such as by indirect exchange, heat can be added by heating the refluxed materials condensed from the vapors produced in the reactor and/or injecting solvent vapor into the gas feed.

The source of molecular oxygen is passed into the reaction mixture at a pressure slightly above the autogenetic pressure of the liquid reaction mixture at the temperature of the reaction mixture slowly during the initial period of reaction until the reaction starts. This can be determined by the heat generated by the reaction and by the rate of vaporization from the reaction mixture. When the reaction commences, the rate of molecular oxygen input can be increased to the maximum rate, which because of the high rate of consumption results in not more than about 2% oxygen by volume in the gas at analyzer 38. Air flows of a linear rate of 0.1 to 0.6 feet per second, depending upon reactor design, may be used as "full flow" or maximum flow. The oxidation reaction is carried out at or about the autogenetic pressure of the reaction mixture without any heat removal until a reaction temperature in the range of 300° to 500° F. is reached and then heat of reaction is removed by condensing at least a portion of the materials vaporized from the reaction mixture. When the maximum rate of reaction is substantially complete, the reaction pressure is increased as needed to maintain the desired reaction temperature. The pressure of the source of oxygen will, of course, need be increased to keep it flowing into the reaction mixture. Under any condition of source of oxygen input, the oxygen content in the vapors should not exceed the explosive limit.

There are many combinations of process steps which will provide the objects of the process of this invention. One of the preferred arrangements is shown in the accompanying diagrammatic flow sheet which forms a part of this specification and which represents a schematic diagram of the improved process of this invention. The invention will be more clearly understood from the following detailed description read in conjunction with said diagrammatic flow sheet with respect to a single reactor. The charging of ingredients to, temperature and pressure control in, removal of products from, etc., the other reactors being the same as described.

The process is carried out in apparatus comprising an atmospheric blending tank 10 having inlet conduits 11, 12 and 13 for introducing the oxidizable organic compound, the reaction medium, and the catalyst in the desired proportions. The blended charge flows through valved conduit 14 to pump 16 which forces the liquid through conduit 17, preheater 18, and valved conduit 19, into reactor 20. In this example the liquid charge to the reactor can be heated in preheater 18 to reaction temperature but is preferably heated to a temperature at which the oxidation reaction will be self-sustaining and using the heat of reaction to bring the reaction mixture to the desired reaction temperature. Alternatively, all of the heating can be accomplished in the reactor making use of a jacket, internal coils, or other indirect heat exchange devices, or part of the heat can be supplied by indirect heat exchange and the heat of reaction be permitted to heat the reaction mixture to the desired temperature. Also the charge can be heated within the reactor by injecting vapors that are compatible with the process such as solvent vapors or vapors of the aromatic compound to be oxidized. In addition the charge stock (i.e., the aromatic compound to be oxidized), the reaction medium and the catalyst can be introduced individually and unmixed directly into the reactor with or without preheating of the individual streams.

Oxygen or oxygen-containing gas, such as air, air enriched with oxygen or air diluted with inert gas, from any suitable source, such as a compressor, is furnished through valved conduit 21 to reactor 20 through conduit 21. When oxygen or mixtures containing more than 20% $O_2$ are used the lower reaction temperatures, 140° F. to 300° F., can be utilized. When air or mixtures containing 20% or less $O_2$ are used temperatures of 300° F. to 500° F. are preferred. Flow meter 24 of any suitable type, such as a rotameter, is provided to measure the instantaneous air flow rate, and valve 25 is provided to control the instantaneous air flow rate. If desired, flow meter 24 may be one of the standard flow controllers available and it may be connected to a suitable type of control valve 25 in order to automatically maintain the instantaneous air flow rate at any predetermined value. High flow rates of any particular source of oxygen can be employed for most of the process of this invention. Generally the source of oxygen is introduced slowly until the reaction commences. Thereafter a full rate of flow, just below that about which will cause flooding of the vapor space with entrained liquids, can be used until the maximum rate of oxidation is substantially complete. Thereafter the rate of addition should not be higher than that providing more than 2 to 4% by volume of oxygen at analyzer 38. One of the reasons for the initial slow addition of molecular oxygen is to prevent an explosive mixture from forming, but once the reaction begins oxygen is consumed rapidly during the maximum rate of oxidation when there is virtually no oxygen in the off gas, not more than 2% and generally 0–2%.

Temperature measuring device 26 measures the reaction temperature. This can be a thermometer, a standard temperature recorder actuated by a thermocouple, or a standard temperature recorder controller connected to add heat from an external source and/or to regulate the input of molecular oxygen.

The unreacted gas from and the materials vaporized in reactor 20 are taken through conduit 30 to condenser 31 in which the vaporized materials are condensed. The gas and liquid flow through conduit 32 to entrainment separator 33 wherein the liquid is separated from the vapor. The liquid returns to the reactor through conduit 34. The uncondensed gas is removed through conduit 35 to other processes, such as a power recovery system, or is discharged to the atmosphere thus providing for the removal of undesirable volatile by-products. Pressure gage 36 is provided for determining the instantaneous static pressure in the reactor, and valve 37 is provided for the purpose of regulating this pressure. If desired, pressure gage 36 may be one of the standard pressure controllers available, and it may be connected to a suitable type of control valve 37 in order to maintain automatically the static pressure at any predetermined value and to increase the static pressure at a predetermined time during the reaction and/or be actuated to increase the pressure when a decrease in reaction temperature occurs. Gas analyzer 38 is provided in order to determine the oxygen concentration in the vent gas stream and may be a continuous oxygen analyzer connected to shut off the source of oxygen when the oxygen content of the exit gas reaches a predetermined value.

A portion of the condensate may be removed through conduit 39 in order to remove condensed by-products. Flow meter 40 which may be of the instantaneous or integrating type is provided to measure the amount withdrawn and valve 41 is used to control the amount withdrawn. Conduit 42 is provided to introduce make-up reaction medium replacing that withdrawn through conduit 39. The material in the reactor is removed as required through conduit 43 for recovery of products, unreacted raw materials, intermediates, catalyst and solvent.

By various well known design features, condenser 31 can be made so that adequate separation of gas and condensate takes place therein and entrainment separator 33 may be eliminated. Further, the condenser may be attached directly to reactor 20, as for example an internal condenser in order to eliminate conduits 30, 32 and 34. In this event, the removal of volatile by-products may be accomplished by limiting the cooling in the condenser so that the portion of the condensible vapors desired to be removed is removed uncondensed with the non-condensible gas. The condensible vapors can then be recovered by any suitable means that does not return them to the reactor.

It will be obvious to one skilled in the art that condenser 31 does not have to operate cold enough to achieve complete condensation of the material vaporized from the reactor. In this case the uncondensed materials can be recovered, if desired, by any one of several means among which are absorption, adsorption and chemical reaction, not shown. Such procedures are known to the art, and neither their omission nor their inclusion are critical to this process. Any solvent, catalyst, or reactants lost in this fashion can be compensated for in the preparation of the initial charge or can be added as make-up during the progress of the oxidation.

It will be apparent to anyone skilled in the art that other types of apparatus can be used equally successfully. The use of specific apparatus or combinations of specific apparatus is not critical to the process of this invention, but rather the procedural step and process conditions are critical. Hence any apparatus which will provide the procedural steps and process conditions will be suitable for the process of this invention.

It does not change the principles of the process if a multiplicity of reactors are used with the liquid contents proceeding sequentially from one to another until the desired degree of completion of the reaction and/or conversion of the reactants is achieved and the liquid is sent to recovery apparatus. Although the accompanying diagrammatic flow sheet does not show the necessary conduits from one reactor to another and means for controlling the flow of the effluent from one reactor to another, it will be readily understood that the effluent from reactor 20 containing the partially oxidized charge stock can be removed through conduit 43 and charged to reactor 20a say through conduit 19a and the effluent from reactor 20a can be withdrawn through conduit 43a and charged to reactor 20b say through conduit 19b. In such a process, the reaction temperature, pressure, oxygen concentrations in feed and vent gases, volatile by-products removal from each reactor can be varied from reactor to reactor in order to duplicate the conditions of the process of this invention for the corresponding period in a single batch reactor.

The process of this invention, as hereinbefore described, can be carried out batchwise in a single reactor, or batchwise simultaneously in two or more reactors or in an intermittent batchwise system wherein the reaction cycles of each reactor are scheduled to make use of the continuous full capacity of the compressor supplying the molecular oxygen. To illustrate such an intermittent batchwise process it is necessary to assume a desired reaction time and a "down time" or "off stream time" which will include time for discharging and washing a reactor as well as placing it back in operation. For a reaction of two hours duration and a "down time" of one hour there would be required three reactors such as reactors 20, 20a and 20b. Also for substantially equal reaction time and "down time" only two reactors would be required. It will be understood that the process of this invention is not limited to these assumptions and number of reactors in an intermittent batchwise process for these assumed conditions and number of reactors are intended to illustrate only a specific process embodiment included in the broad concept of the disclosed invention.

In carrying out such a specific intermittent batchwise process using three reactors there would first be charged, for example, reactor 20 and the process hereinbefore described in detail would be carried out. Then reactor 20a would be made ready so that when one-half of the reaction cycle of reactor 20 had been completed, the oxidation reaction in reactor 20a can be started. Similarly, when one-half of the oxidation reaction cycle of reactor 20a was reached, the oxidation in reactor 20b can be started, at which time reactor 20 would be on its "down time" cycle. Then when one-half of the oxidation reaction cycle of reactor 20b was reached, reaction in reactor 20 can be started. The accompanying diagrammatic flow sheet provides the necessary conduits, valves and auxiliary equipment for carrying out such an intermittent batchwise process. Thus the process of this invention can be carried out in a plurality of reactors utilizing similar auxiliary apparatus.

The process of this invention is applicable to the catalytic liquid phase oxidation of a wide variety of aliphatic substituent aromatic compounds. For example, terephthalic (para) acid may be obtained by the oxidation of any 1,4-dialkyl benzene, for example 1-methyl-4-ethylbenzene, 1-methyl-4-isopropylbenzene (p-cymene), 1,4-diisopropylbenzene, or 1-ethyl-4-n-butyl benzene. Other aliphatic substituted aromatic compounds which may be oxidized to aromatic carboxylic acids, and the products obtained thereby, are: alkyl aromatics as toluene, the xylenes, pseudocumene, durene, mesitylene, hemimellitene, di-tert-butyl benzene, m-diisopropylbenzene, m-cymene, m-tert-butyl cumene, and o-amyl toluene to the corresponding aromatic mono- or poly-carboxylic acid or alkyl-aromatic carboxylic acid; alkenyl aromatics as styrene, and alkyl-vinyl benzenes to aromatic carboxylic acids; fused-ring aromatics as acenaphthene to naphthalic acid, methyl naphthalene to naphthoic acid, and phenanthrene (the central ring behaving as an aliphatic substituent) to diphenic acid; naturally occurring fused-ring aromatics as coal to mixed aromatic polycarboxylic acids, and wood charcoal to humic acid and mixed aromatic polycarboxylic acids; diphenyl-type compounds as ditolylethane to isophthalic and terephthalic acids; aromatics containing oxygenated substituents as toluic acids to phthalic acids, acetophenone to benzoic acid, and cumic acid, hydroxycumic acid, alpha-alpha'-dihydroxydiisopropylbenzene, p-diacetyl benzene, and p-tolualdehyde to terephthalic acid; substituted alkyl-aromatics as p-toluene sulfonic acid to p-sulfobenzoic acid, p-nitrotoluene to p-nitrobenzoic acid, p-tolunitrile to terephthalic acid, chloro-p-xylene to chloroterephthalic acid, and p-chlorotoluene to p-chlorbenzoic acid.

The process of this invention is illustrated by the following specific examples.

*Example I*

A mixed xylene containing 85% ortho-xylene, 9.0% meta-xylene, 4% para-xylene and 2.0% ethylbenzene is oxidized to a phthalic acid product containing the three isomeric phthalic acids and benzoic acid by the process of this invention in the following manner. There is provided in a corrosion resistant reactor 20 a liquid reaction mixture containing 408 parts by weight of the xylene, 810 parts of acetic acid and 7.0 parts of manganese bromide at 350° F. Valve 37 is adjusted to a pressure of about 200 p.s.i. and air just above 200 p.s.i. is slowly passed into the reaction mixture without removal of heat of reaction until the reaction mixture is at about 400° F. Thereafter, air is added at full flow, vapors are withdrawn to condenser 31, operated at about 120° to 125° F., and the condensate returned to the reaction mixture. The air added to the reaction mixture at the increased rate provides not more than about 2% of oxygen by volume as measured by gas analyzer 38. In about 30 to 40 minutes of operating at the increased rate of addition of air (at this point the temperature of the reaction mixture would drop to about 290° F. if heat were not added or air input was not decreased), valve 37 is adjusted to maintain a pressure of about 450 p.s.i. as measured by gage 36 and a reaction temperature of 400° F. is maintained, pressure of the air input is adjusted so that the rate of addition of oxygen at the higher pressure remains constant and so the oxygen content in the vapors measured by gas analyzer 38 does not exceed about 2 to 4% oxygen by volume. When the oxygen reaction has substantially ceased as indicated by a sudden change in oxygen concentration to about 6 to 8% oxygen by volume measured by gas analyzer 38, air input is stopped, the pressure is reduced by removal of vapors from the reactor and the reaction mixture is cooled to about 325° F.

The resulting reaction mixture is removed, cooled to about 225° F. and filtered to remove the solids, which comprise terephthalic acid and isophthalic acid. The remaining filtrate is distilled to first remove water and acetic acid, then to remove benzoic acid, and finally to recover ortho-phthalic acid as its anhydride. There is produced by such a process about 64.0 parts by weight of the mixture of isophthalic acid and terephthalic acid (about 69% isophthalic acid and 31% terephthalic acid) and about 360 parts by weight of phthalic anhydride. The overall yield of phthalic acids based on the xylene content of the feed stock xylene is about 117 weight percent.

The mixture of isophthalic acid and terephthalic acid can be separated by well-known means, for example, by esterifying this mixture with methanol and distilling the resulting mixture of esters.

*Example II*

A mixed xylene containing 95% para-xylene (the remaining 5% being meta-xylene) can be oxidized by the process of this invention in the following manner. To a corrosion resistant reactor 20 there is charged a liquid reaction mixture containing 488 parts by weight of the mixed xylene, 1250 parts by weight of caprylic acid, 7 parts by weight of manganese acetate, and 5 parts by weight of ammonium bromide at 315° F. Valve 37 is adjusted to about 5 p.s.i. and air at a pressure of about 7 p.s.i. is added slowly maintaining an oxygen content in the vapors in the reactor between 2 to 4% as measured by analyzer 38 without removal of heat of reaction permitting the temperature of the reaction to increase slightly until a self-sustaining oxidation reaction is indicated. The heat of reaction is thereafter removed by condensing in condenser 21 vapors from the reaction mixture (principally xylene and water) and returning the condensate to the reaction mixture to maintain a reaction temperature of about 380° F. while input of air is increased to maximum flow providing an oxygen content in the vapors measured by analyzer 38 of about 2% by volume. When about 50% of the theoretical amount of oxygen is consumed, valve 37 is adjusted to about 50 p.s.i., the reaction temperature maintained at about 380° F. and the pressure of the input of oxygen is increased to maintain about the same rate of oxygen input and to provide an amount of oxygen in the gas as measured by analyzer 38 of about 2 to 4% by volume. When the oxygen content of the gas at analyzer 38 increases to about 6% by volume indicating substantial completion of the reaction, the input of oxygen is stopped and an inert gas is passed into the reaction mixture to remove oxygen from the reaction system. Thereafter, the pressure in the reactor is decreased while cooling the reaction mixture to about 300° F.

The resulting liquid mixture is withdrawn from the reaction and further cooled to crystallize all of the phthalic acid product. This solid phthalic acid product is washed with hot acetic acid and dried. The phthalic acid product so produced contains about 94% terephthalic acid and about 6% isophthalic acid. The overall phthalic acid yield based on the xylene is about 125 weight percent.

The caprylic acid can be recovered from the filtrate by distillation. The residue from this distillation can be treated to recover the catalyst, if desired, or discarded.

*Example III*

Into a suitable reactor having a corrosion resistant inner surface (e.g. glass, ceramic or corrosion resistant metal or alloy), equipped with agitating means such as a mechanical agitating device or gas flow agitating means, and with means for heating or cooling the contents thereof such as a coil or jacket (and optionally a reflux condenser equipped with a separatory device for separating water and refluxing non-aqueous condensate to the reaction vessel, a gas inlet tube, and a vent for passing off low boiling materials), there are charged:

48.8 parts by weight of xylene (95% para)
125 parts of acetic acid (100%)
0.6 part of manganese acetate
0.5 part of ammonium bromide The reaction vessel is about half filled with the liquid mixture.

Air is fed into the reaction mixture at the rate of 3,000 volumes/hour/volume of reaction mixture (measured at the reactor exit at atmospheric pressure and about 27° C.) while the reaction mixture is maintained at 195° C. with vigorous agitation for two hours; and the pressure is maintained at about 200 to 400 p.s.i.g. (pounds per square inch gauge); this pressure being such that the reaction mixture contains a liquid phase containing acetic acid.

The crude solid terephthalic acid in the mixture may be separated by filtration, given three washings with about 100% acetic acid, each washing being with about 100 parts by weight of acetic acid per 40 parts of the precipitate, and then given three washings with water, using approximately similar amounts. The acetic acid washings are distilled; the residue may be recycled to the reactor or may be processed to recover a mixture of aromatic acids therefrom. The exit gases from the reactor are passed through two Dry Ice traps in series, and the liquid collected therein during the reaction was washed with about 2 volumes of water to remove water soluble materials therefrom, and a small amount of unreacted xylene is recovered.

A light colored terephthalic acid product is obtained in a weight yield of about 118 percent (75% of theory). Similar results are obtained with manganese or cobalt bromide as the catalyst.

*Example IV*

To reactor 20 of corrosion resistant construction there is charged on a part by weight basis:

| | Parts |
|---|---|
| Mixed xylene (13% ethylbenzene, 24% ortho-xylene, 18% para-xylene and 45% meta-xylene) | 8,000 |
| Glacial acetic acid | 12,000 |
| Tetrabromoethane | 21.6 |
| Mixture of manganese and cobalt acetates | 64.8 |

The conditions of the reaction are tabulated below wherein the "Reaction Time" begins when the reaction mixture is at 382° F. and 250 p.s.i.g. and the exit gas flow is standard cubic feet per minute (s.c.f.m.).

| Reaction Time, Minutes | Temperature, ° F. | Pressure, p.s.i.g. | Exit Gas (Conduit 35) Flow (s.c.f.m.) |
|---|---|---|---|
| 0 | 382 | 250 | 11 |
| 3 | 394 | 250 | 16 |
| 7 | 396 | 260 | 22 |
| 12 | 398 | 290 | 22 |
| 22 | 408 | 310 | 22 |
| 32 | 420 | 340 | 16 |
| 37 | 400 | 350 | 11 |
| 42 | 414 | 350 | 11 |
| 52 | 342 | 350 | 11 |

Heat of reaction is permitted to heat the reaction mixture to about 390° F. and the reaction is maintained at 400° to 410° F. during the maximum rate of oxidation removing heat by condensing acetic acid and less volatile materials and returning the condensate to the reactor. After about 32 minutes of reaction time the oxygen content of the exit gas rises sharply and the pressure is increased to 340 to 350 p.s.i.g. causing the temperature to increase. There is a temperature fluctuation while the air input is adjusted. The reaction is completed at about 410 to 420° F. until a sharp increase in oxygen content of the exit gas occurs. During the first 30 minutes of reaction time the oxygen content of the exit gas is .0 to 0.3%. After the rise at about 32 minutes and the increase in temperature and pressure and decrease of air input, the oxygen content of the exit gas drops to 0 to 2% until the reaction is substantially complete and a high oxygen concentration in the exit gas again occurs.

Thereafter, the reactor contents are cooled to about 300° F. while oxygen-containing vapors are removed by releasing a substantial portion of the pressure. The remainder of the pressure is employed to discharge the reactor contents. The resulting reaction mixture is cooled to 140° F. and charged to a centrifugal filter to recover the solid acids from the acetic acid mother liquor.

From an analysis of the solid acid cake after drying to remove acetic acid and analysis of the acetic acid mother liquor the following yields based on the contents of the xylene feed are determined:

| Aromatic acid: | Weight percent yield |
|---|---|
| Benzoic acid | 97 |
| Toluic | 1 |
| Orthophthalic acid | 141 |
| Isophthalic acid | 125 |
| Terephthalic acid | 150 |

Orthophthalic acid can be removed from the filter cake by leaching with hot water, 150° to 200° F., leaving a solid mixture of isophthalic acid and terephthalic acid which can be separated by means well known to the art. Orthophthalic acid can be recovered from the aqueous solution by crystallization and/or evaporation of the water. The benzoic acid, toluic acid and orthophthalic acid in the acetic acid mother liquor can be recovered, for example, by distilling off and separately recovering the acetic acid, the benzoic acid, toluic acid and phthalic anhydride.

*Example V*

Pseudocumene can be oxidized to trimelletic acid by the process of this invention, for example, by passing air into a reaction mixture containing pseudocumene, glacial acetic acid, and oxidation catalyst in the proportions tabulated below on a part by weight basis:

| | Parts |
|---|---|
| Pseudocumene | 6,000 |
| Glacial acetic acid | 18,000 |
| Tetrabromoethane | 36 |
| Mixture of manganese and cobalt acetates | 225 |

The reaction conditions were as follows:

| Reaction Time, Minutes | Temperature, °F. | Pressure, p.s.i.g. | Exit Gas (Conduit 35) Flow (s.c.f.m.) |
|---|---|---|---|
| 0 | 370 | 300 | 4 |
| 5 | 422 | 325 | 13.5 |
| 10 | 432 | 330 | 19 |
| 20 | 429 | 330 | 19 |
| 30 | 422 | 330 | 19 |
| 40 | 420 | 360 | 8 |
| 45 | 434 | 375 | 6.5 |
| 60 | 430 | 375 | 5 |
| 70 | 426 | 380 | 5 |
| 120 | 420 | 380 | 5 |
| 150 | 420 | 380 | 5 |

The reaction is started at 370° F. and permitted to heat to 420° F. without removal of heat of reaction. The reaction is carried out thereafter at about 330 p.s.i.g. and 422 to 430° F. for more than 30 minutes. Between 30 and 40 minutes the reaction pressure and air input are adjusted to maintain the reaction temperature since a decrease in rate of reaction is noted at this period of time by an increase in oxygen in the exit gas from 0.8 to more than 3.0 percent. Also heat from an external source is added to maintain a sufficiently high reaction rate at 425 to 430° F.

In this process an oxygen content in the exit gas of above 8 to 10% can be tolerated for the latter portion of the reaction. When the oxygen content of the exit gas is about 20%, the air is shut off, the reactor pressure is reduced, the reactor contents are cooled to 325° F. and discharged. The reactor effluent is cooled to 140° F. and charged to a centrifugal filter to recover the trimellitic acid. The filter cake when dried represents a yield of about 96 weight percent. Additional trimellitic acid can be recovered from the acetic acid mother liquor.

*Example VI*

To prepare trimesic acid by the process of this invention there is charged to reactor 20 on a part by weight basis:

| | Parts |
|---|---|
| Mesitylene | 1,500 |
| Acetic acid (90%) | 3,380 |
| Tetrabromoethane | 15 |
| Mixture of manganese and cobalt acetates | 30 |

The operating conditions of the process were as follows:

| Reaction Time, Minutes | Temperature, °F. | Pressure, p.s.i.g. | Exit Gas (Conduit 35) Flow (s.c.f.m.) |
|---|---|---|---|
| 0 | 396 | 250 | 2.3 |
| 5 | 438 | 250 | 5.8 |
| 30 | 418 | 250 | 5.8 |
| 35 | 402 | 350 | 5.8 |
| 40 | 394 | 400 | 2.3 |
| 60 | 394 | 400 | 2.3 |
| 115 | 379 | 400 | 2.3 |

In this process a very rapid reaction takes place in the first 5 minutes causing the reaction temperature to increase above the desired 410° F. to 420° F. at 250 p.s.i.g. After about 35 minutes of reaction time the rate of reaction decreases and the rate of air input and pressure is adjusted. Although the pressure was increased from 200 to 400 p.s.i.g. the temperature could not be maintained at 410° F. to 420° F. without supplying external heat. Supplying external heat would reduce the total reaction time. However, by this process there is recovered from the discharged reactor contents cooled to 100° F. a weight yield of dry trimesic acid of 148 weight percent (85% of theory).

In the process of this invention any of the aromatic compounds hereinbefore enumerated can be employed in place of those used in the illustrative examples. Also catalysts containing in conjoint presence a heavy metal oxidation catalyst and bromine other than those illustrated can be employed. For example, nickel acetate and hydrobromic acid; ferrous bromide; cerium oxide or hydroxide and hydrobromic acid; manganese acetate, ammonium vanadate and hydrogen bromide; tungstic acid, ammonium bromide and hydrogen bromide; cobalt naphthenate and bromine; and manganese versene and hydrogen bromide among others can be employed in place of the catalysts of the illustrative examples with excellent results. Benzoic acid, cyclohexane carboxylic acid, phenyl-acetic acid can be used as the reaction medium to advantage in the oxidation of certain compounds according to the process of this invention. Hence the process of this invention is not limited to the specific embodiments described and illustrated but rather is readily applicable to the liquid phase oxidation with molecular oxygen of the class of compounds herein disclosed in the presence of the catalyst system comprising the conjoint presence of heavy metal oxidation catalyst and bromine and in the presence of the monocarboxylic acid reaction medium. The use of the aromatic feed stock, catalyst and reaction medium is not the subject of this invention but rather the particular procedural steps hereinbefore disclosed and described in carrying out the oxidation reaction whereby variation and control of temperature and control of pressure are accomplished is the end to which this invention is directed as defined in the appended claims.

This application is a continuation-in-part of our copending application Serial No. 530,401, filed August 24, 1955, now U.S. Patent No. 2,833,816.

What is claimed is:

1. The preparation of a benzene polycarboxylic acid by reacting in an oxidation reactor, while maintaining a liquid phase therein, a polyalkyl benzene with molecular oxygen in the presence of a catalyst consisting of the conjoint presence bromine and a heavy metal oxidation catalyst and in the presence of a reaction medium solvent comprising a monocarboxylic acid containing 2 to 8 carbon atoms selected from the class consisting of benzoic acid and lower alkanoic acids at a temperature above 140° F. and at a pressure to maintain said liquid phase in the oxidation reactor wherein molecular oxygen is introduced into said liquid phase and heat of reaction is removed by passing into a cooling zone gases and vapors generated from said liquid phase; the improved combination therewith of: providing in said oxidation reactor a liquid mixture consisting essentially of said polyalkyl benzene, said catalyst and said reaction medium solvent at the minimum temperature at which at least an essential portion of the oxidation reaction is self-sustaining at the initial temperature and at an initial pressure to maintain a liquid phase of said mixture; introducing molecular oxygen into said liquid phase to initiate the oxidation of the polyalkyl benzene to said self-sustaining oxidation state at a rate to maintain as a maximum of from 2 to 4% oxygen by volume in the mixture of gases and vapors generated from said liquid phase; permitting the temperature of the liquid phase in said oxidation reactor to increase through retention of heat of reaction from said initial temperature to the temperature of maximum oxygen consumption in the range of from above 300° F. up to 500° F. and at the autogenetic pressure at said higher temperature while increasing the rate of introduction of molecular oxygen to provide as a maximum of from 2 to 4% oxygen by volume in the mixture of gases and vapors generated from said liquid phase; thereafter removing heat of reaction by contacting at least a portion of the mixture of gases and vapors generated from the liquid phase with a cooling zone, condensing therein at least a portion of the vapors from said mixture and returning the condensate to the liquid phase in the oxidation reactor while withdrawing the uncondensed portion of the mixture of gases and vapors from said cooling zone to maintain said generated pressure; maintaining the introduction of molecular oxygen at said maximum rate until the drop in temperature of the liquid phase occurs, thereafter increasing pressure in said oxidation reactor to maintain as the reaction temperature said temperature of maximum oxygen consumption obtained at said maximum rate of introduction of molecular oxygen and decreasing the rate of molecular oxygen introduction to provide as a maximum of from 2 to 4% oxygen by volume in said withdrawn gases and vapors until further reduction of introduction of molecular oxygen does not prevent the oxygen volume concentration in said withdrawn gases and vapors from increasing above the explosive limit and thereafter stopping the rate of molecular oxygen introduction and withdrawing the contents of the oxidation reactor for recovery of the benzene polycarboxylic acid produced.

2. A process for carrying out sequential reactions in a plurality of oxidation reactors connected to a common supply of gas containing molecular oxygen wherein the oxidation process of claim 1 is carried out independently in each of said oxidation reactors by starting the oxidation in a subsequent reactor when the oxidation in the prior reactor has progressed into at least a portion of the period of maximum oxidation and carrying out each independent oxidation process to substantial completion oxidation.

3. The preparation of a phthalic acid by the catalytic liquid phase oxidation with molecular oxygen of xylene, the improved method of operation consisting substantially essentially of: providing in an oxidation reactor at a temperature of about 350° F. and a pressure of 200 p.s.i.g. a liquid reaction mixture containing xylene and for each 100 parts by weight thereof 200 parts of acetic acid, and 1.7 parts manganese bromide both by weight; initiating oxidation by introducing air into said reaction mixture at a rate to provide as a maximum of about 2% to 4% oxygen by volume in the mixture of gases and vapors generated from said reaction mixture; permitting the temperature of the reaction mixture to reach 400° F. without the removing of heat reaction; thereafter increasing the rate of introduction of air to provide the maximum rate of oxygen consumption at 400° F. and to provide as a maximum of about 2% oxygen by volume in the mixture of gases and vapors generated from said liquid phase; contacting mixture of gases and vapors generated from said liquid phase at 400° F. with a cooling zone operated at a temperature in the range of 120–125° F. returning the condensate to the reaction mixture and withdrawing the uncondensed portion of said gases and vapors; continuing said reaction under 400° F. and maximum introduction of air for a time of about 30 to 40 minutes; thereafter increasing the pressure in the oxidation reactor to about 450 p.s.i. thereby maintaining a reaction temperature of 400° F. while adjusting the rate of air introduction to provide as a maximum of from 2 to 4% oxygen by volume in the uncondensed portion of the mixture of gases and vapors until further adjustment of the air input does not prevent said oxygen concentration in the uncondensed gases and vapors from increasing to about 6 to 8% by volume; and thereafter stopping the introduction of air and withdrawing the contents of the oxidation reactor for recovery of the phthalic acid produced.

4. The preparation of a phthalic acid by the catalytic liquid phase oxidation of a xylene with molecular oxygen by the process consisting substantially essentially of: providing in an oxidation reactor at a temperature of 315° F. and a pressure of 5 p.s.i.g. a liquid reaction mixture containing for each 100 parts by weight of xylene 255 parts of caprylic acid and 1.5 parts manganese acetate and 1.0 part ammonium bromide all by weight; initiating oxidation by introducing air into said liquid reaction mixture at a rate to provide in the mixture of gases and vapors generated for the liquid mixture in the oxidation reactor an oxygen concentration a maximum of from 2 to 4% by volume; permitting the temperature of the reaction mixture to increase to 380° F. without the removal of heat of reaction; thereafter contacting the mixture of gases and vapors generated from said liquid reaction mixture with a cooling zone to remove heat of reaction, condensing a portion of the vapors and returning the condensate to the reaction mixture to maintain a reaction temperature of 380° F. and withdrawing the uncondensed mixture of gases and vapors; maintaining the introduction of air at 380° F. at an increased rate to provide as the maximum oxygen consumption and as a maximum oxygen concentration in the uncondensed portion of gases and vapors withdrawn from said cooling zone an oxygen content of about 2% by volume; increasing the reaction pressure to about 50 p.s.i.g. when 50% of the theoretical amount of oxygen required to oxidize both methyl groups to carboxylic acid groups has been added to the reaction mixture; adjusting the rate of introduction of air at 380° F. and 50 p.s.i. to maintain an oxygen concentration in said withdrawn uncondensed gases and vapors as a maximum of about 2 to 4% by volume until further adjustment of the rate of introduction of air does not prevent said oxygen concentration from increasing to the range of 6 to 8% by volume and thereafter stopping the introduction of air and removing the contents of the oxidation reactor for recovery of the phthalic acid produced.

5. The preparation of trimellitic acid by the catalytic liquid phase oxidation of pseudocumene with air by the process consisting substantially essentially of providing in an oxidation reactor at a temperature of about 370° F. and a pressure of 300 p.s.i.g., a liquid reaction mixture consisting essentially of pseudocumene and for each 100 parts thereof 300 parts acetic acid and as a catalyst system for said oxidation, 3.7 parts total of manganese and cobalt acetates and 0.6 part tetrabromoethane, all by weight; initiating oxidation by introducing air into said reaction mixture and permitting the temperature of said reaction mixture to increase to 420° F. without the removal of heat of reaction; thereafter increasing the introduction of air to said reaction mixture to provide the maximum rate of oxygen consumption at a temperature in the range of 420–430° F. and a pressure of 330 p.s.i.g. for about 30 minutes reaction time and removing heat of reaction by contacting the mixture of gases and vapors generated from said reaction mixture with a cooling zone to condense acetic acid vapors, returning the condensate to the reaction mixture and withdrawing the uncondensed mixture of gases and vapors; increasing the reaction pressure when the oxygen in said uncondensed mixture is about 3% by volume to maintain a reaction temperature of about 430° F. thereafter adjusting the introduction of air to provide an oxygen concentration of about 8 to 10% $O_2$ by volume in the uncondensed portion of the gases and vapors withdrawn from acid cooling zone wherein heat of reaction is removed; and thereafter when the oxygen content in said uncondensed gases and vapors exceeds 10% by volume stopping the introduction of air and withdrawing the contents of the oxidation reactor for recovery of trimellitic acid.

References Cited in the file of this patent

UNITED STATES PATENTS

| 2,552,267 | Emerson et al. | May 8, 1951 |
| 2,833,816 | Saffer et al. | May 6, 1958 |
| 2,907,792 | McIntyre | Oct. 6, 1959 |

FOREIGN PATENTS

| 762,793 | Great Britain | Dec. 5, 1956 |

UNITED STATES PATENT OFFICE
CERTIFICATE OF CORRECTION

Patent No. 3,089,906                                                May 14, 1963

Alfred Saffer et al.

It is hereby certified that error appears in the above numbered patent requiring correction and that the said Letters Patent should read as corrected below.

In the heading to the sheet of drawings, line 2, and in the heading to the printed specification, line 2, title of invention, for "OXIDATION CHEMICAL PROCESS", each occurrence, read -- CONTROLLED LIQUID PHASE OXIDATION PROCESS FOR AROMATIC ACID PRODUCTION --; column 1, line 32, for "benzate" read -- benzoate --; column 12, line 62, for "nicket" read -- nickel --; column 14, line 12, strike out "oxidation"; line 26, after "heat" insert -- of --.

Signed and sealed this 10th day of December 1963.

(SEAL)
Attest:

ERNEST W. SWIDER

Attesting Officer

EDWIN L. REYNOLDS

Acting Commissioner of Patents